United States Patent [19]
Nolan

[11] 3,725,817
[45] Apr. 3, 1973

[54] HIGH POWER LASER SYSTEM
[75] Inventor: Thomas E. Nolan, Medfield, Mass.
[73] Assignee: RCA Corporation
[22] Filed: Sept. 2, 1964
[21] Appl. No.: 393,831

[52] U.S. Cl. ................................331/94.5, 350/285
[51] Int. Cl. ..............................................H01s 3/00
[58] Field of Search ............331/94.5; 350/6, 7, 285

[56] References Cited

UNITED STATES PATENTS

| | | | |
|---|---|---|---|
| 1,979,296 | 11/1934 | Sweeney | 350/6 |
| 2,670,660 | 3/1954 | Miller | 350/285 |
| 2,758,502 | 8/1956 | Scott et al. | 350/7 |
| 3,315,177 | 4/1967 | Benson | 331/94.5 |
| 3,328,112 | 6/1967 | Soules et al. | 331/94.5 |
| 3,398,379 | 8/1968 | Sims et al. | 331/94.5 |
| 3,434,073 | 3/1969 | Forkner | 331/94.5 |

OTHER PUBLICATIONS

Trion, "Total Internal Reflecting Geometry Ruby Rods" Technical Bulletin T-1261-1 Dec. 4, 1961, 1 page.

Primary Examiner—Ronald L. Wibert
Attorney—Edward J. Norton

[57] ABSTRACT

Disclosed is a system for decreasing the required angular velocity of a mechanically rotated Q switch for a laser for any given speed of switching the laser cavity from a low Q switch state thereof to a high Q state thereof. This is accomplished by incorporating means for providing a predetermined plural number of reflections by the rotating Q switch for each single round trip of the laser beam through the cavity.

7 Claims, 7 Drawing Figures

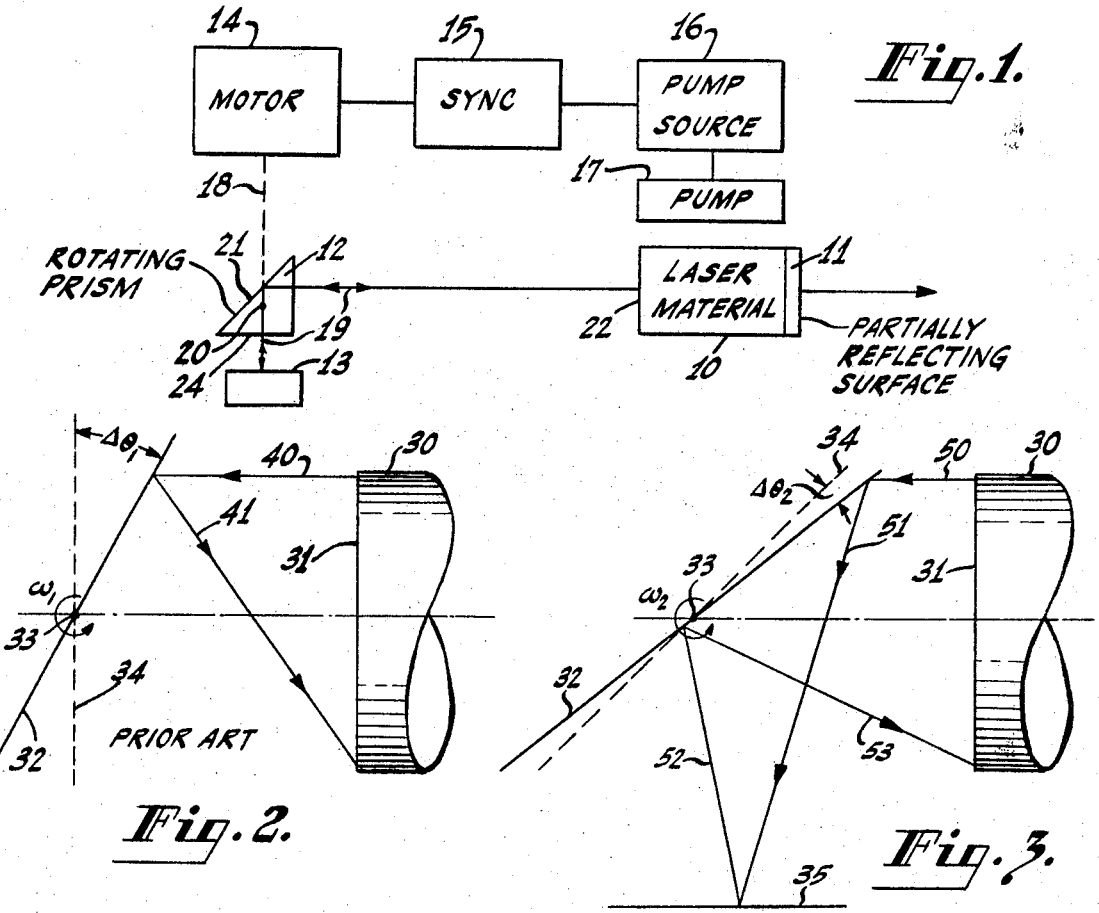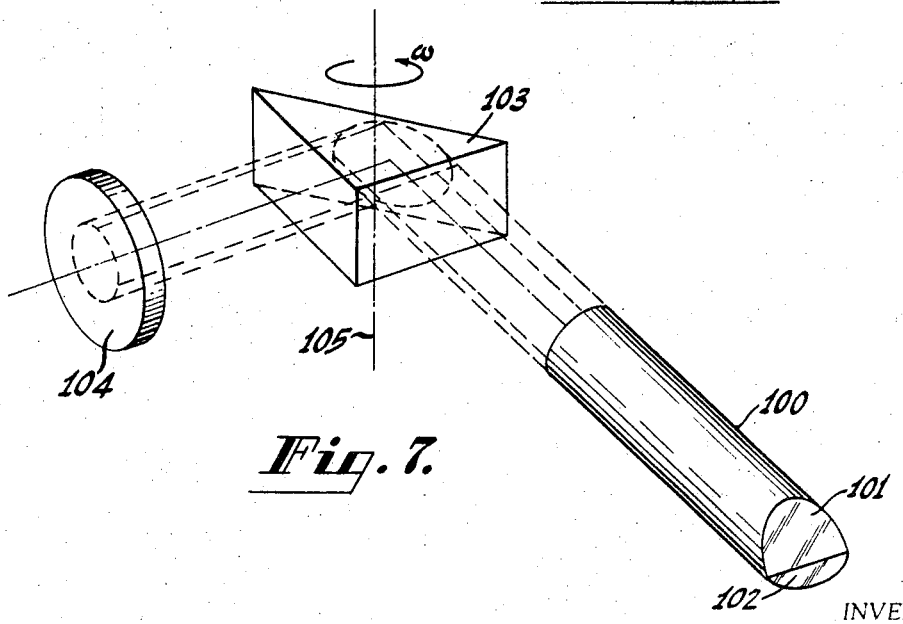

INVENTOR.
THOMAS E. NOLAN
BY
Attorney

HIGH POWER LASER SYSTEM

This invention relates to laser systems and particularly to an improved optical system for use in a laser to obtain high power.

Many of the potential uses of lasers require a high power laser beam. One technique for obtaining high power in lasers is known as Q switching. Q switching is based on the relationship between population inversion threshold in a laser material, i.e. the minimum population inversion required for laser action, and cavity Q. According to this technique a high population inversion below the threshold is established in the negative temperature laser material while the Q of the cavity is maintained at a low value. After this population inversion is established the Q is rapidly increased thereby decreasing the threshold value of population inversion and producing laser action. The result is a very intense laser beam.

One Q switching technique is based upon the characteristic of laser cavities that the cavity Q is determined in part by the degree of parallelism between two reflectors or mirrors, one at either end of the cavity. One of the reflectors is made partially transparent to provide an output beam. These two reflectors form a Fabry-Perot interferometer and are employed in lasers to provide a resonant structure for the optical energy emitted by the active material. When the two reflectors are parallel, then substantially no energy emitted in a direction perpendicular to the reflectors is lost, except that contained in the output beam. Thus when the reflectors are parallel, the effective Q is high. As the reflectors become less parallel, the effective Q of the cavity decreases.

One of the two reflectors may be maintained stationary while the other is rotated about an axis parallel to its plane of reflection. Parallelism therefore occurs once per revolution of the rotating reflector. When the two reflectors are parallel the cavity Q is high; when they are non-parallel the Q is low. The active material is pumped to a high population inversion during non-parallelism of the two reflectors by synchronizing the firing of the laser pumping source with the position of the rotating reflector.

In the above described technique the transition from very low Q to very high Q is not instantaneous but rather depends upon the angular velocity of the beam reflected from the spinning reflector and therefore on the speed of rotation of the spinning reflector. As the spinning reflector begins to come into parallelism with the rotating reflector, the Q of the cavity begins to increase until the reflectors are parallel and the Q is maximum. Highest energy levels of the output beam are obtained by a very rapid switching from low to high Q. When the spinning reflector technique is employed, this means that very high rotational speeds should be used. Limitations in the size and mechanical strength of rotating parts which can be effectively employed to rotate the reflectors place limitations upon rotational speeds and therefore on the amount of power practicably obtainable by this technique.

It is therefore an object of the present invention to provide an improved optical system for switching the Q of a laser cavity.

It is a further object of the present invention to provide an optical system for switching the Q of a laser cavity at higher rates than those heretofore practicably obtainable.

It is a further object of the present invention to provide improved apparatus and techniques for obtaining relatively higher power levels from lasers than those heretofore practicably obtainable.

It is a further object of the present invention to provide improved apparatus and techniques for effectively multiplying the rate Q-switching of a laser cavity.

The above objects are accomplished according to the present invention by employing in a laser system an optical multiplying system to increase the effective rotational speed of a spinning reflector. Briefly, the optical multiplying system of the present invention includes a rotating reflecting surface and means to reflect a light beam a plurality of times from the rotating surface. As will be shown more fully below, the plurality of reflections cause the beam reflected by the last reflection to move at an angular velocity which is greater than the angular velocity when only the rotating reflector is used.

In one embodiment of the present invention the optical multiplying system comprises two reflecting elements, (1) a rotating reflector, which may be a spinning flat or preferably a rotating prism, and (2) a stationary reflecting surface positioned to reflect a light beam which has been reflected from the rotating reflector back to the rotating reflector. A second stationary reflector which is partially transmitting forms a Fabry-Perot interferometer with the first stationary reflector and the laser material is placed within the interferometer.

A more detailed description of particular embodiments of the invention will now be given in connection with the accompanying drawing in which:

FIG. 1 is a block diagram of a system embodying the present invention;

FIG. 2 is a diagram of a prior art laser Q switching arrangement;

FIG. 3 is a diagram of a Q switching arrangement employing the present invention;

FIG. 7 is an isometric view illustrating an alternative embodiment of the present invention.

Figure 4:
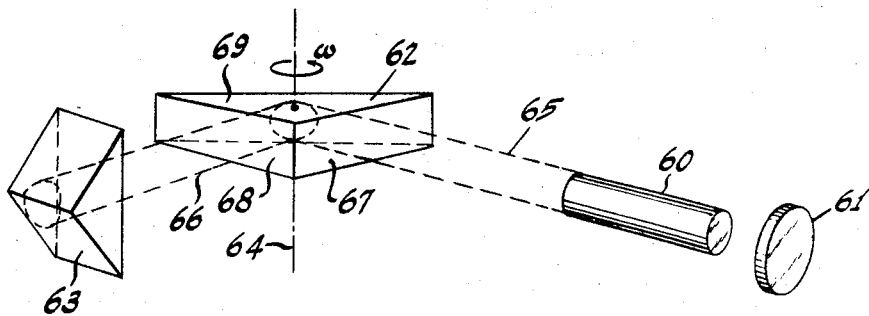
FIGS. 4 through 6 are isometric views illustrating three embodiments of the present invention.

Before describing the embodiments of the present invention shown in the drawing, a brief description of laser operation in relation to Q switching will be given.

In general a laser includes at least three elements, (1) an active or negative temperature material, capable of stimulated emission of radiation, (2) a pump for supplying energy to the negative temperature material and (3) a cavity containing the negative temperature material which permits oscillation at the frequency of the output laser beam.

The essential characteristic of the negative temperature material which makes it suitable for laser operation is that a population inversion may be established between two atomic energy levels. In the operation of the laser, the population inversion is established between two energy levels corresponding to the laser output frequency by causing low energy electrons to be transferred to higher energy levels. This electron transfer is caused by supplying input energy to the negative temperature material from the pump. When the high energy electrons in the more densely populated energy level return to the less densely populated lower energy level, the device emits light at a frequency corresponding to the energy difference between the two states. The intensity of the light thus produced is directly related to the magnitude of the population inversion.

In order for the light produced by the transfer to take the form of a stimulated emission of radiation i.e. coherent laser radiation, the inverted population density, caused by pumping electrons from low energy levels to the higher levels, must be above a minimum or threshold population inversion. Population inversions below this threshold will not permit laser action. The value of this threshold population inversion is determined in part by the Q of the cavity containing the active material. The laser cavity is constructed to permit oscillations at the frequency of the output energy. Therefore the cavity stores some of the energy emitted by the negative temperature material. The Q of a cavity is a measure of its ability to contain or store this energy and to prevent losses. As the losses of the cavity increase and the Q becomes lower, higher values of population inversion are required for laser action; i.e. the threshold increases. Therefore an active material can be pumped to a high population inversion without lasing if the cavity Q is maintained at a low value. In Q switching the laser material is pumped to a high population inversion while the cavity is maintained at a low Q. The Q is then switched to a high value and a very intense laser beam is produced.

FIG. 1 shows a laser Q switching arrangement employing the present invention. An active laser material 10, e.g. a ruby crystal, is positioned between a partially reflecting surface 11 and a rotatable right triangular prism 12. A stationary reflector 13 is placed near the rotatable prism 12. The partially reflecting surface 11 forms a Fabry-Perot interferometer with the stationary reflector 13. The rotatably prism 12 is rotated about an axis 20 parallel to the three triangular sides of the prism by a motor 14 through a mechanical connection indicated by the dotted line 18. Input energy is supplied to the laser material 10 by a conventional pump 17. Where the laser material 10 is a ruby crystal, the pump may take the form of the well-known xenon discharge lamp. A source 16 controls the firing of the pump 17. A synchronizing mechanism 15 is employed to synchronize the firing of the pump 17 with the shaft position of the motor 14.

For a discussion of prior techniques as well as a brief discussion of the present invention see Benson and Mirarchi, The Spinning Reflector Technique for Ruby Laser Pulse Control, IEEE Transactions on Military Electronics, January 1964, pages 13–21. If the spinning flat technique were used in the system of FIG. 1 then the flat would be rotated about the axis 20 with its plane of reflection parallel to the axis. When the angular position of the flat were such that its plane of reflection were parallel to the partially reflecting surface 11, then substantially all of the energy, i.e. light, emitted from the end 22 of the laser material 10 would be reflected from the flat back into the laser material 10. This would be the high Q position. As the angular position of the flat deviated slightly from this parallel position the Q would decrease until eventually none of the energy emitted from the end 21 of the laser material 10 would be reflected back into the laser material. This position would correspond to zero Q. In the embodiment of the present invention shown in FIG. 1 the spinning flat of the prior art is replaced by a rotating prism 12 and a stationary reflector 13. The use of these two elements accomplishes a much faster Q switching than was heretofore available at moderate rotational speeds. The position of the rotating prism 12 shown in FIG. 1 is the high Q position. Thus, a light beam 19, emitted from the end 22 of the laser material 10 is reflected from the prism's longest side 21 to the reflecting surface 13 and then back through the prism 12 to the laser material 10. The faces 23 and 24 of the prism are preferably coated with a suitable low reflectance coating material such as magnesium fluoride. A comparison of the multiplying operation of the rotating prism 12 and the stationary reflector 13 with prior art arrangements will be given below with reference to FIGS. 2 and 3 after a brief description of the operation of the laser of FIG. 1.

The operation of the laser shown in FIG. 1 is essentially the same as those which have been employed with the prior art techniques with the exception that the actual Q switching technique has been improved by incorporating the present invention. The laser material 10 is pumped to a high population inversion once per revolution of the prism 12 by supplying energy to the pump 17 from the source 16. For best operation the high population inversion should be established just before the prism 12 reaches the high Q position. Synchronization between the position of the prism 12 and the operation of the pump 17 is therefore desirable. Conventional techniques may be employed to obtain such synchronization. The synchronizing mechanism 15 may, for example, include a shaft position transducer which is arranged to trigger the pump source 16 at the proper instant of time. The particular timing relationship between shaft position and operation of the pump source is best determined empirically for each individual system. As a general figure the prism 12 should reach the position shown about 500 milliseconds after the pump 17 has been fired. The reflector 13 is here shown as a flat. Generally it is advisable to use a Porro prism rather than a totally reflecting flat in order to avoid alignment problems which may be present when a conventional flat is used.

FIGS. 2 and 3 show, respectively, diagrams of a conventional Q switching technique and one embodiment of the present invention.

In FIG. 2 a portion 30 of a laser rod, such as the laser rod 10 of FIG. 1, is shown. The end 31 of the laser rod 30 corresponds to the end 22 of the laser rod 10 in FIG. 1 opposite the partially reflecting surface 11. A reflecting surface 32 which generally takes the form of an optical flat or a total internal reflection prism rotates about an axis 33 parallel to its plane of reflection. The high Q position of the rotating reflector 32 is indicated by the dotted line 34. That is, in the position indicated by the dotted line 34, substantially all of the energy in the form of light which leaves the laser material 30 from the end 31 is reflected back into the laser material 30. The position of the reflector 32 as shown in FIG. 2, i.e. $\Delta\theta_1$ degrees from the high Q position 34 is the position at which the Q begins to increase from zero as the reflector 32 rotates counter-clockwise. In this position a light ray 40 emitted from one side of the laser material 30 is reflected from the surface 32 to the opposite side of the laser 30. Clearly, energy emitted from any other position of the end surface 32 is not reflected back to the surface 31 but rather is reflected outside the end surface 31. Thus, at this angular position $\Delta\theta_1$ the Q of the cavity begins to increase from zero until it reaches its maximum value when the reflector 32 reaches the dotted line position 34. It is well known that maximum energy outputs are obtained when the Q of the cavity is rapidly changed from zero to its maximum value. Thus, in the arrangement shown in FIG. 2 the actual switching of the cavity Q from zero to its maximum value occurs while the reflector 32 is being rotated through the angle $\Delta\theta_1$. The time required for the change is therefore $\Delta\theta_1/\omega_1$, where $\omega_1$ is the angular velocity of the reflector 32. In order to obtain extremely rapid switching the rotational speed of the reflector 32 must be high. It is one purpose of the present invention to provide a Q switching arrangement which provides extremely rapid switching at relatively low rotational speeds.

The principles of the present invention will be described with reference to FIG. 3. In FIG. 3 a reflector 32 is again mounted to rotate about an axis 33 parallel to its plane of reflection and to reflect the light energy emerging from the laser material 30 at the surface 31. The reflector 32 is here shown as a plane reflecting surface for purposes of simplicity in the following discussion. Generally it is advisable to employ a right triangular prism as shown in FIG. 1. An additional reflecting surface 35 is located to the side of the reflecting surface 32. The high Q position of the reflector 32 in the present embodiment is indicated by the dotted line 34. When the reflector 32 reaches this position substantially all of the light emerging from the laser 30 at surface 31 is reflected back into the laser 30 by first being reflected by the reflector 32 to the reflector 35 and then back to the reflector 32 and back to the surface 31. The position of the reflector 32 in FIG. 3 corresponds to substantially the same Q as does the position of the reflector 32 in FIG. 2. That is, when the reflector 32 in FIG. 3 is in the position shown, the cavity Q just begins to change from zero to its maximum value. Thus a light ray 50 emerging from one side of the laser rod 30 is reflected via the path 50, 51, 52, 53 to the opposite side of the laser rod 30. The change from this position of the reflector 32 to the high Q position indicated by dotted line 34 requires the reflecting surface 32 to rotate through an angle $\Delta\theta_2$. Note that the angle $\Delta\theta_2$ is much smaller than the angle $\Delta\theta_1$ shown in FIG. 2. For equal angular speeds, $\omega_1 = \omega_2$, the change from low Q to high Q will be much faster in the arrangement of FIG. 3 than that of FIG. 2 by a factor of 2. Therefore the arrangement of FIG. 3 provides a fast switching technique for moderate rotational speeds. In the technique of the present invention the light emerging from the laser rod reflects from the rotating reflector twice, whereas in the prior art arrangement only one reflection is experienced. This double reflection causes an increased angular velocity of the reflected beam over the angular velocity of the reflected beam 41 in FIG. 1. Greater increases in the switching rate may be accomplished by causing reflections from the rotating reflector. Some techniques for causing more reflections from the rotating reflector are described below.

Figure 5:
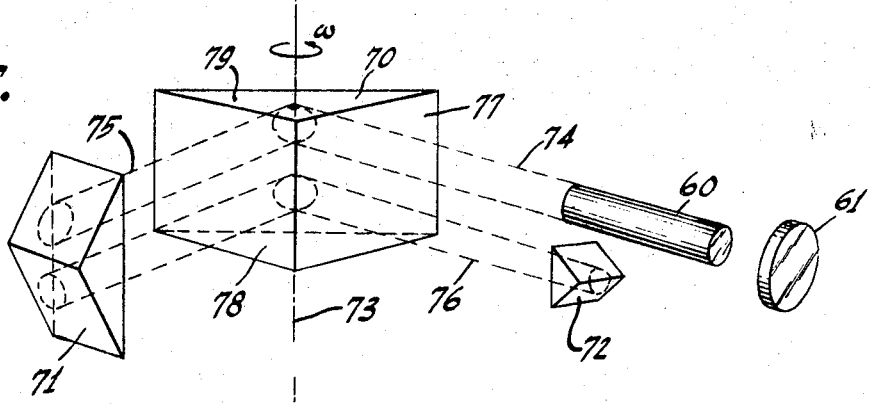
Figure 6:
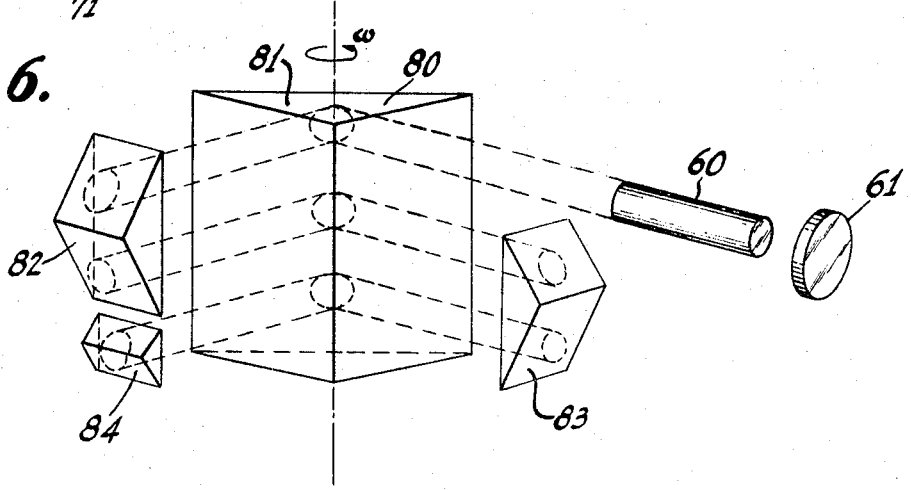

FIGS. 4 through 6 are diagrams of three embodiments of the present invention in which like reference numerals denote like elements. In FIG. 4 an active laser material 60, e.g. a ruby crystal, is positioned between an optical flat 61 which is dielectrically coated for partial transmission and partial reflection and a right triangular prism 62. A totally internal reflecting prism 63 is positioned in proximity to the right triangular prism 62. The non-reflecting surfaces of the two prisms 62 and 63 are preferably coated with a suitable material such as a magnesium fluoride to prevent losses. The right triangular prism 62 is mounted to rotate about an axis 64 which passes through the prism 62 and is parallel to and equally spaced from the two equal length short sides 67 and 68 of the prism 62. At one angular position of rotation about the axis 64 the prism 62 establishes a reflection coincidence between the optical flat 61 and the total internal reflection prism 63. The term "reflection coincidence" is used herein to describe a condition where a light ray reflected from a first reflector along the same path by which it was incident upon the reflector, e.g. reflected perpendicularly from an optical flat, is reflected in the same manner from a second reflector and returns to the first reflector along the same path by which it was first incident upon the first reflector. Thus in FIGS. 2 and 3 the dotted line 34 represents a position at which reflection coincidence occurs. In FIG. 2 the reflection coincidence occurs between reflector 32 and the partially reflecting surface (not shown) at the other end of the laser rod 30. In FIG. 3 the reflection coincidence occurs between the reflector 35 and the partially reflecting surface. In the reflection coincidence position shown in FIG. 4 optical energy in the form of a beam 65 emitted from the laser crystal 60 passes perpendicularly through one of the two short sides 67 of the prism 62. The light beam 65 is reflected by the third side 69 of the prism 62 and passes perpendicularly out through the second short side 68. The beam of light 66 which passes perpendicularly through the short side 68 is incident upon the total internal reflection prism 63 and is reflected back into the prism 62 along substantially the same path by which it left the prism 62. The reflection coincidence position or high Q position is established once per revolution of the prism 62. As the prism 62 rotates about the axis 64 the Q of the laser cavity periodically changes from a zero value to a very high value. The angular velocity of the reflected beam from the position 65 shown is approximately twice that which would be obtained by employing a single rotating flat. The time required for switching between the low Q value and the high Q value in the embodiment shown in FIG. 4 is substantially the same as that of FIG. 3 described above.

In both of the embodiments of FIGS. 5 and 6 the light beam emerging from the laser material reflects a plurality of times from the rotating reflector. As was pointed out above, as the number of reflections from the rotating surface increases, the angular velocity of the beam last reflected increases and therefore the switching time decreases.

In FIG. 5, the laser crystal 60 is positioned between a partially transmitting flat 61 and a right triangular prism 70. A second right triangular prism 71 is positioned to receive a light beam 75 reflected from the prism 70 and to reflect the beam back into the first prism 70. A total internal reflection prism 72 is positioned directly under the laser crystal 60. The right triangular prism 70 is rotatable about the axis 73. As noted above, in order to prevent energy losses the reflecting surfaces of the prisms should be coated with a suitable material. In the position shown reflection coincidence occurs between the flat 61 and the total internal reflection prism 72. A light beam 74 emerging from the crystal 60 enters the right triangular prism 70 perpendicularly through one of its short sides 77. The beam 74 is reflected by the side 79 perpendicularly out through the second short side 78. The reflected beam 75 enters the right triangular prism 71 and is reflected back into the prism 70 along a path parallel to but spaced from the beam 75 along which it travelled to the prism 71. The beam is then again reflected by the side 79 of the prism 70 and passes perpendicularly through the short side 77. The reflected beam 76 is then incident upon the total internal reflection prism 72. The prism 72 reflects the light beam back into the prism 70 and eventually back to the laser crystal 60. In this embodiment of the invention, the angular velocity of the last reflected beam and therefore the switching speed from a zero Q position to a high Q position is approximately twice that of the embodiment shown in FIG. 4.

In general the switching speed may be increased to any desired value by increasing the number of reflections from the rotating reflecting surfaces. A further extension is shown in FIG. 6. Here the light beam emerging from the laser crystal 60 reflects a total of six times from the rotating surface 80 of the right triangular prism 81. In this embodiment, two stationary right triangular prisms 82 and 83 are positioned to reflect the light beam back into the rotating prism 81 to cause the multiple reflections. A total internal reflection prism 84 is positioned to reflect the light beam back into the prism 81 along substantially the same path by which it left the prism 81. In the embodiment of FIG. 6 the switching speed is three times of that of the embodiment of FIG. 4.

Although it is generally desirable to employ prisms to provide the necessary reflections, any suitable reflecting surface capable of withstanding the intense energy of the laser beam may be employed. Thus in any of the embodiments of FIGS. 4 through 6 the rotating prisms may be replaced by optical flats. Furthermore, while the total internal reflection Porro prisms 63, 72 and 84 of the three embodiments are generally desirable to avoid alignment problems totally reflecting flats may be employed in their place.

In the embodiments of FIGS. 4 through 6, the laser crystal 60 is positioned between a partially reflecting, partially transmitting optical flat 61 and the rotating prism of the Q switch. An alternate arrangement is shown in FIG. 7. In FIG. 7 a laser crystal 100 is cut at one end for total internal reflection. Two planar surfaces 101 and 102 are cut at the end of the crystal 100 at an angle of 90° with respect to each other. A partially reflecting, partially transmitting optical flat 104 is employed to form the second reflector of the interferometer. The rotating prism 103 is placed so that at one angle of rotation about the axis 105 reflection coincidence is established between the total reflection cut surfaces 101, 102 and the partially reflecting flat. The arrangement of FIG. 7 is similar to that of FIG. 4 above in that the laser beam is reflected only twice from the rotating prism 103. Any of the embodiments of FIGS. 4 through 6 above may be modified in the manner suggested by the structure of FIG. 7.

What is claimed is:

1. In a laser comprising an active laser material within an optical cavity for generating a beam of light from said active laser material, wherein said cavity is of the type incorporating a Q switch including a mechanically rotated reflective element for switching the Q of said cavity between a relatively low value state thereof and a relatively high value state thereof at a rate which is proportional to the angular velocity of said rotated reflective element; the combination therewith of stationary additional reflective means forming part of said cavity which are oriented in cooperative relationship with said rotated reflective element when said cavity is in its high Q state to cause said beam of light to be reflected by said rotated reflective element a predetermined plural number of times for each single round-trip pass of said beam through said cavity, whereby the required angular velocity of said rotated reflective element for any given switching rate is reduced in accordance with the value of said predetermined plural number.

2. The combination defined in claim 1, wherein said rotated reflecting element is a substantially 45° right triangular prism rotated about an axis substantially parallel to an edge of said prism, said beam from said laser material being substantially normal to a first face of said prism which includes one of its short sides when said cavity is in its high Q state, and wherein said stationary reflective means includes means oriented relative to said prism to reflect light emanating from said prism in a direction normal to a second face thereof which includes the other of its short sides when said cavity is in its high Q state back in a direction normal to said second face.

3. The combination, defined in claim 1, wherein said predetermined plural number is two.

4. The combination defined in claim 1, wherein said predetermined plural number is four.

5. The combination defined in claim 1, wherein said predetermined plural number is six.

6. In laser apparatus of the type including an active laser medium in the form of a rod having opposite end face portions, one face portion being partially light reflective and the other face portion being substantially totally light transmissive, means for pumping said laser medium to effect emission of a light beam from said other face portion, rotatable reflector means for reflecting said beam of light back onto said other face portion when said reflector means is in one of its rotated positions, and means for rotating said reflector means at a predetermined speed, the improvement comprising: optical means for reducing the duration of impingement of the reflected beam of light of said other face to a value less than the duration of impingement corresponding to the recited rotational speed of said reflector means, said optical means including fixed reflector means oriented with respect to said rotatable reflector means to effect a plurality of reflections of said beam of light by said rotatable reflector means prior to reflection of such beam by said rotatable reflector means onto said other face portion of said laser medium.

7. In laser apparatus according to claim 6, wherein said optical means comprises at least a first stationary roof prism and a second stationary roof prism, said first roof prism being positioned to receive light reflected by said rotatable reflector means and effective to return such reflected light to said rotatable reflector means, said rotatable reflector means being oriented to reflect said light received from said first roof prism onto said second roof prism, said prisms in the recited reflector orientation being effective to return said light to said rotatable reflector means for reflection onto said other face of said laser medium.

* * * * *